United States Patent [19]

Krein et al.

[11] Patent Number: 5,469,435
[45] Date of Patent: Nov. 21, 1995

[54] BUS DEADLOCK AVOIDANCE DURING MASTER SPLIT-TRANSACTIONS

[75] Inventors: William T. Krein, San Jose; Ronald R. Hochsprung, Los Gatos; James D. Kelly, Aptos, all of Calif.

[73] Assignee: Apple Computer, Inc., Cupertino, Calif.

[21] Appl. No.: 187,396

[22] Filed: Jan. 25, 1994

[51] Int. Cl.$^6$ ..................................... G06F 13/00
[52] U.S. Cl. .................. 370/85.2; 395/285; 395/303; 395/342; 395/290
[58] Field of Search ............... 370/85.1, 85.2, 370/85.6, 85.13, 85.3; 395/200, 275, 325, 375, 725; 364/DIG. 2, DIG. 1

[56] References Cited

U.S. PATENT DOCUMENTS 5,297,292  3/1994  Morimoto et al. ............ 370/85.2
5,319,755  6/1994  Farmwald et al. ............ 395/325

FOREIGN PATENT DOCUMENTS 0369264  5/1990  European Pat. Off. .
0432076  6/1991  European Pat. Off. .
0518527  12/1992  European Pat. Off. .

*Primary Examiner*—Douglas W. Olms
*Assistant Examiner*—Huy D. Vu
*Attorney, Agent, or Firm*—Albert C. Smith

[57] ABSTRACT

Signal transactions are conducted between nodes coupled to a bus, without causing bus deadlock during split transactions. Deadlock avoidance is achieved by rendering a node effectively unavailable at such times to serve as a bus slave for a new bus master. When the "locking" node serves as a transaction source, deadlock is avoided by deasserting, during a split transaction, a buffer-available signal, which is used normally to indicate receiver buffer availability. Additionally, when the "locking" node serves as a transaction destination, deadlock is avoided by deasserting a bus-ownership request signal, which is used normally for requesting bus ownership. After completion of the split transactions, such signals may be unmasked.

27 Claims, 3 Drawing Sheets

(SOURCE NODE)

(DESTINATION NODE)

BUS DEADLOCK AVOIDANCE DURING MASTER SPLIT-TRANSACTIONS

BACKGROUND OF THE INVENTION

1. Field of the Invention

The invention relates to electronic communication, particularly to signaling protocol and related circuitry for facilitating data communication through bus lines.

2. Description of Background Art

The use of bus signal lines is common in electronic system design. In processor-based systems, buses are used typically for reading and writing signals, for example, between a motherboard including a microprocessor and other system boards or nodes coupled to the bus, including memory devices, input/output controllers and other peripheral components.

Because bus signal lines are shared by various system components, bus arbitration means are provided typically to prevent contention between components desiring to access common signal lines simultaneously. Thus, according to some specified arbitration criteria, bus ownership may be granted to priority components requesting bus access.

To improve bus utilization, some bus arbiters allow so-called "split" transactions (i.e., instead of singular accessing events) to be performed during read or write operations. For example, a write operation might be split into two operations: data packet writing and then confirmation of writing completion. Similarly, a read operation might be split into a read request step, followed eventually by a read response step (including the read data packet).

By using previously unused "down" times between two halves of split transactions to perform other transactions, bus bandwidth may be increased significantly. However, for a bus arbitration scheme using split transactions to function properly, it is necessary for each node in the system to be able to process transactions which occur between corresponding split transaction events. For example, a bus master node should be able to handle a packet write operation after issuing a read request, but before its corresponding read response packet is received.

Unfortunately, not all components or peripheral boards which might be coupled electrically to system mother boards through conventional bus interfaces are configured for split transaction processing. In these cases, there is a risk that such unconfigured nodes, when connected to a split-transaction type bus interface, might cause a bus "deadlock," during which the unconfigured node fails to process new transactions arising between corresponding split transaction events. Accordingly, there is a need to provide a more effective bus communication technique wherein bus deadlock is avoided during split transactions.

SUMMARY OF THE INVENTION

The invention resides in a bus signaling system, having bussed signal lines and a plurality of devices or nodes coupled thereto, for conducting signal transactions (e.g., data packet read or write operations) between such nodes, without causing bus deadlock during split transactions.

Deadlock avoidance is achieved by rendering one of the nodes effectively unavailable to serve as a bus slave to a new bus master. For example, when the "locking" node is serving as a transaction source, deadlock is avoided by deasserting, during a split transaction, a buffer-available signal, which would be used normally to indicate receiver buffer availability.

Similarly, when the "locking" node is serving as a transaction destination, deadlock is avoided by deasserting a bus-ownership request signal, which would be used normally for requesting bus ownership. After completion of the split transactions, such deasserted signals may then be unmasked.

Optionally, a back-off protocol is performed after deassertion of the bus-ownership request signal, thereby causing at least one node to wait for a specified delay or to ignore specified signals.

DETAILED DESCRIPTION OF THE PREFERRED EMBODIMENT

Figure 1:
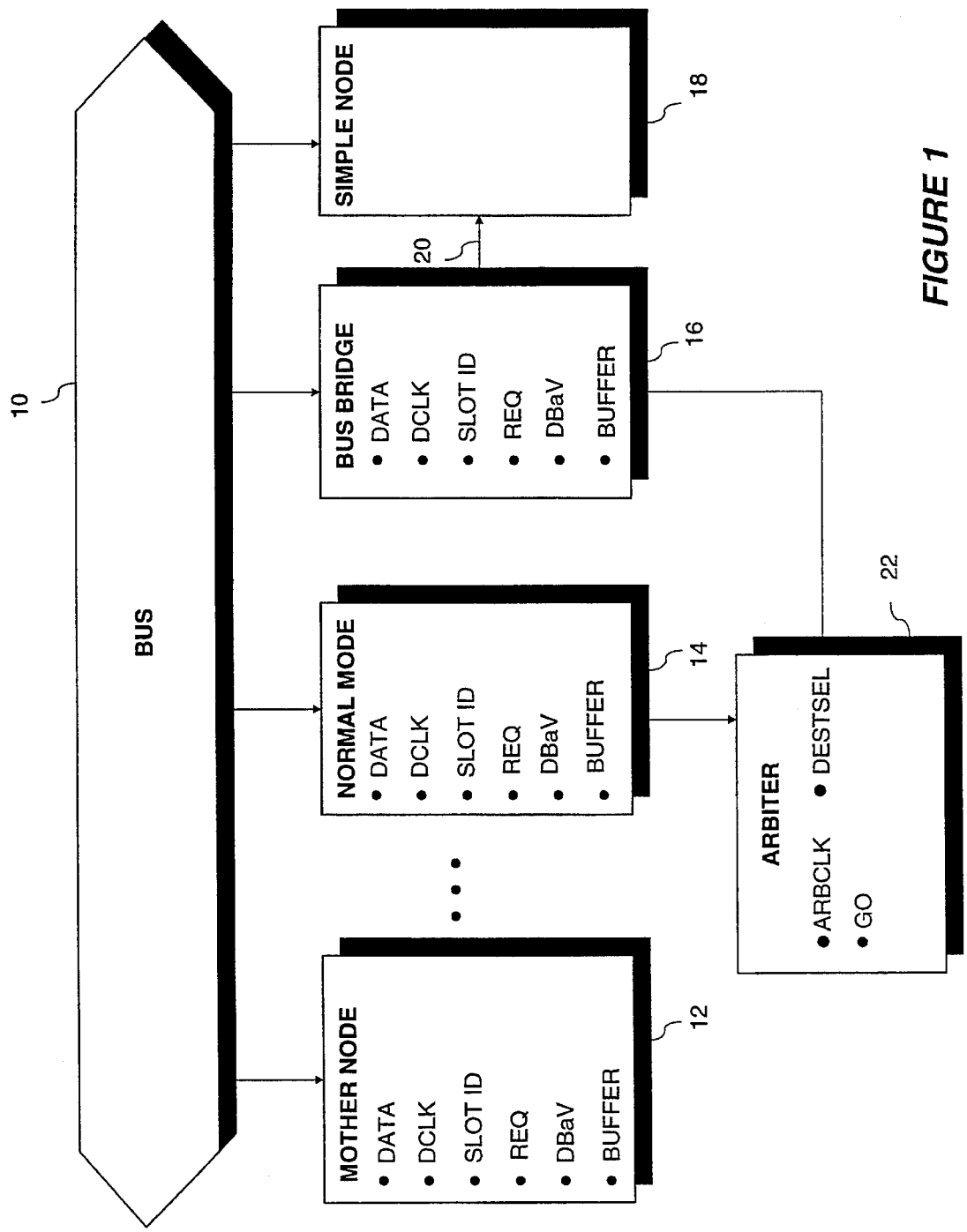
FIG. 1 is a generalized block diagram of an electronic system interconnected for bus communication according to the present invention.

As shown in the block diagram of FIG. 1, the present invention is embodied in an electronic signal communication system or technique using bus controller or arbiter 22, multi-signal line bus 10 and various devices, boards or nodes 12, 14, 18 coupled removably thereto. The inventive system provides high-performance bandwidth for data transfers (e.g., packet read or write transactions) through bus 10 coupled electrically between a full-service device, such as main logic or "mother" node 12 or peripheral or "normal" node 14 (i.e., devices that can service a new data transaction as a bus destination node or "slave" to a new bus source node or "master" between corresponding events of a split transaction) and partial-service device or "simple" node 18 (i.e., devices, such as common direct memory access circuits, that are not otherwise configured to service normally a new data transaction arising during split transactions, and therefore potentially locking). For reasons described herein, simple node 18 may be coupled to bus 10 through bus bridge 16 and local bus 20.

The present system operates generally in two modes: (1) full-service mode, during which data transfers may be performed between full-service nodes 12, 14 for all transaction types, including split and non-split transactions; and (2) partial-service mode, during which data transfers may be performed between partial-service node 18 and full-service node 12 or 14 (or between two partial-service nodes 18 coupled as well to bus 10). In accordance with the present invention, data transfers with simple nodes 18 are possible for all transaction types, even during split transactions, thereby avoiding bus deadlock which may arise during conventional data transfers with simple nodes 18 during split transactions.

During full-service mode, data transfers may occur between full-service nodes 12, 14, as follows for the cases of master-based write (non-split) and read (split) operations. For example, when a data packet is ready for transmission from mother node 12 (or conversely in this example, from normal node 14), which would thereby serve as master or source, a location of the destination node 14 (or conversely, mother node 12) is indicated at identification signal lines (4-bit "Slot ID" signal) by the master or source node.

If mother node 12 is sending the data packet to be written to destination node 14, then mother node 12 also asserts a request for bus ownership ("Req" signal). This request is received synchronously with an arbitration clock ("Arb-CLK" signal) by arbiter 22, which arbitrates bus access by checking an indication ("DBAv" signal) of availability of a buffer at destination node 14. If so available, arbiter 22 indicates ("Go" signal) a grant of ownership of bus 10 to requester node 12 and indicates ("DestSel" signal) to destination node 14 that it has been selected for a transaction.

After bus 10 is granted to source node 12, such node 12 may transmit packet header and information ("Data" signal) to destination node 14. Preferably, data transfer is 32-bit wide and synchronous with a data clock ("DClk" signal, which is supplied by the bus master and may be unrelated to ArbClk signal), which is transmitted with Data signal through bus 10, wherein received Data signal is synchronized inherently with received DClk signal.

Additionally, signals ("Valid/Done" signals) may be issued by source node 12, indicating respectively that Data signal contains valid information and DClk is stable, and that the final piece of information is being transferred, preferably during the second half period or "tick" of DClk signal. Preferably, a complete DClk cycle is allowed after assertion by node 12 of Valid/Done signals to clear line buffers. Note that because the write operation is accomplished within a single data transfer (i.e., "dump and run" without write confirmation), no split transaction arises for such operation.

During data read, however, split transactions arise in bus 10. When mother node 12 sends a packet for reading from destination node 14, then mother node 12 asserts Req signal.

Similarly, Go and DestSel signals are provided by arbiter 22, such that a read request packet, including header but no data, may be sent by source node 12 to destination node 14. When Go signal is deasserted after packet transfer, ownership of bus 10 is relinquished, and the read transaction is effectively split.

Later, during a corresponding second half event of the split read transaction, wherein destination node 14 reacquires bus 10 for responding to read request by asserting RespReq signal, destination node 14 sends the requested data packet to source node 12. This response operation is equivalent to a slave-based write operation to source node 12, but destination node 14 need not check the master DBAv signal (i.e., to determine whether source node 12 has reserved an available buffer for the response data packet); this is why RespReq signal is used instead of Req signal.

Similarly to master data transfer, destination node 14 transmits packet header and data to source node 12, preferably 32 bits wide and synchronously to and with DClk through bus 10. Also, after Valid/Done signals are asserted, additional DClk tick is provided for clearing line buffers.

In the case of operating the present signal communication system in partial-service mode, bus deadlock avoidance arises when partial-service or simple node 18 is coupled to bus 10 for data transfer therewith during split transactions. In accordance with the present invention, simple node 18 is rendered effectively unavailable to serve as a bus slave for a new bus master arising between corresponding split transaction events.

In particular, when simple node 18 serves as transaction source, deadlock is avoided by deasserting, during split transaction, buffer-available signal (e.g., DBAv signal,) which would be used normally to indicate receiver buffer availability. Similarly, when simple node 18 serves as transaction destination, deadlock is avoided by deasserting bus-ownership request signal (e.g., Req signal,) which would be used normally for requesting ownership of bus 10. After completion of such split transactions, deasserted signals may be unmasked to restore availability of simple node 18.

Because simple node 18 may not be equipped functionally to cause DBAv or Req signal assertion or deassertion, thereby rendering simple node 18 effectively unavailable during split transactions, interface controller or bus bridge 16, which includes such functional capability, couples simple node 18 through local bus 20 to bus 10.

Figure 2:
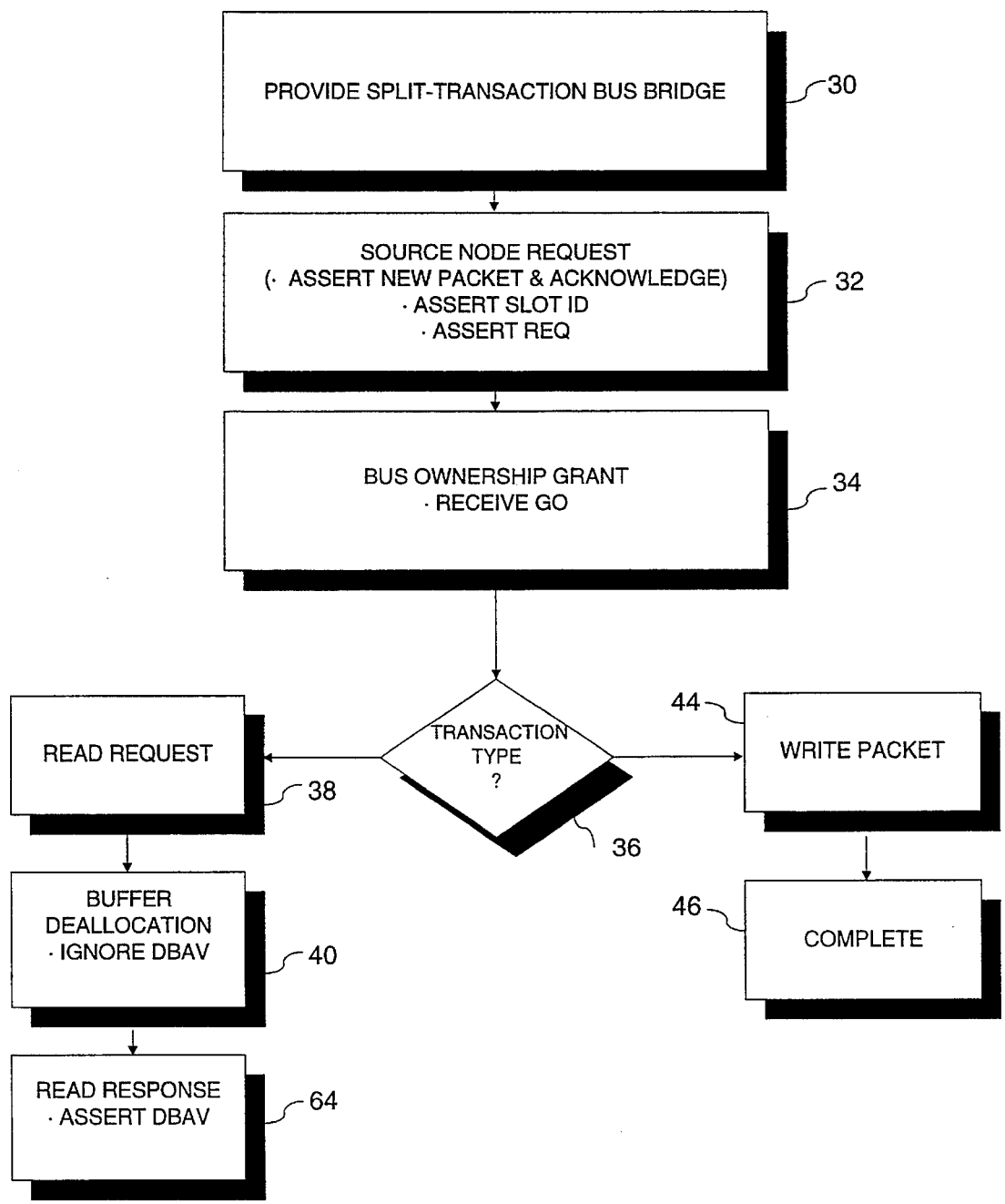
FIG. 2 is a simplified flow chart of an inventive signal communication process from the perspective of a source node.

FIG. 2 shows a sample process flow for deadlock avoidance wherein simple node 18 serves as source node. Initially, bus bridge 16 is provided 30 to couple electrically simple node 18 to bus 10 through local bus 20. As source node, simple node 18 requests 32 access to own bus 10 by providing new packet signal to bridge 16, which responds by asserting Req (or RespReq) and SlotID signals on bus 10, thereby indicating synchronously with ArbClk to arbiter 22 request for write to (or read from) destination node identified by Slot ID.

When arbiter 22 determines availability of requested node according to destination DBAv status, arbiter 22 grants 34 bus 10 ownership by providing Go signal to simple node 18. As a result of detecting Go signal, bus bridge 16 and simple node 18 may launch transaction by loading and bursting data packet, synchronously with DClk, through bus 10.

If data transfer or transaction type is determined 36 by bus bridge 16 or simple node 18 according to packet header information to be data read 38, then simple node 18 buffer, provided possibly in bus bridge 16, is deallocated, preferably before next valid clock tick. In this way, DBAv signal for simple node 18 is ignored effectively by other nodes coupled to bus 10, and simple node 18 does not service other nodes at this time, until occurrence of corresponding split transaction event (i.e., read packet response).

Thus, when slave/destination node provides read response packet, DBAv signal of simple node 18 is reasserted 42 possibly by bus bridge 16, and data packet received by bus bridge 16 may be transferred to simple node 18. Also, Req signal for simple node 18 is deasserted to allow new read or write cycle to begin.

If data transfer or transaction type is determined 36 by bus bridge 16 or simple node 18 according to packet header information to be data write 44, then simple node 18 through bus bridge 16 simply completes data packet burst 46 to its allocated destination node. Also, Req signal is deasserted to allow new read or write cycle to begin.

Figure 3:
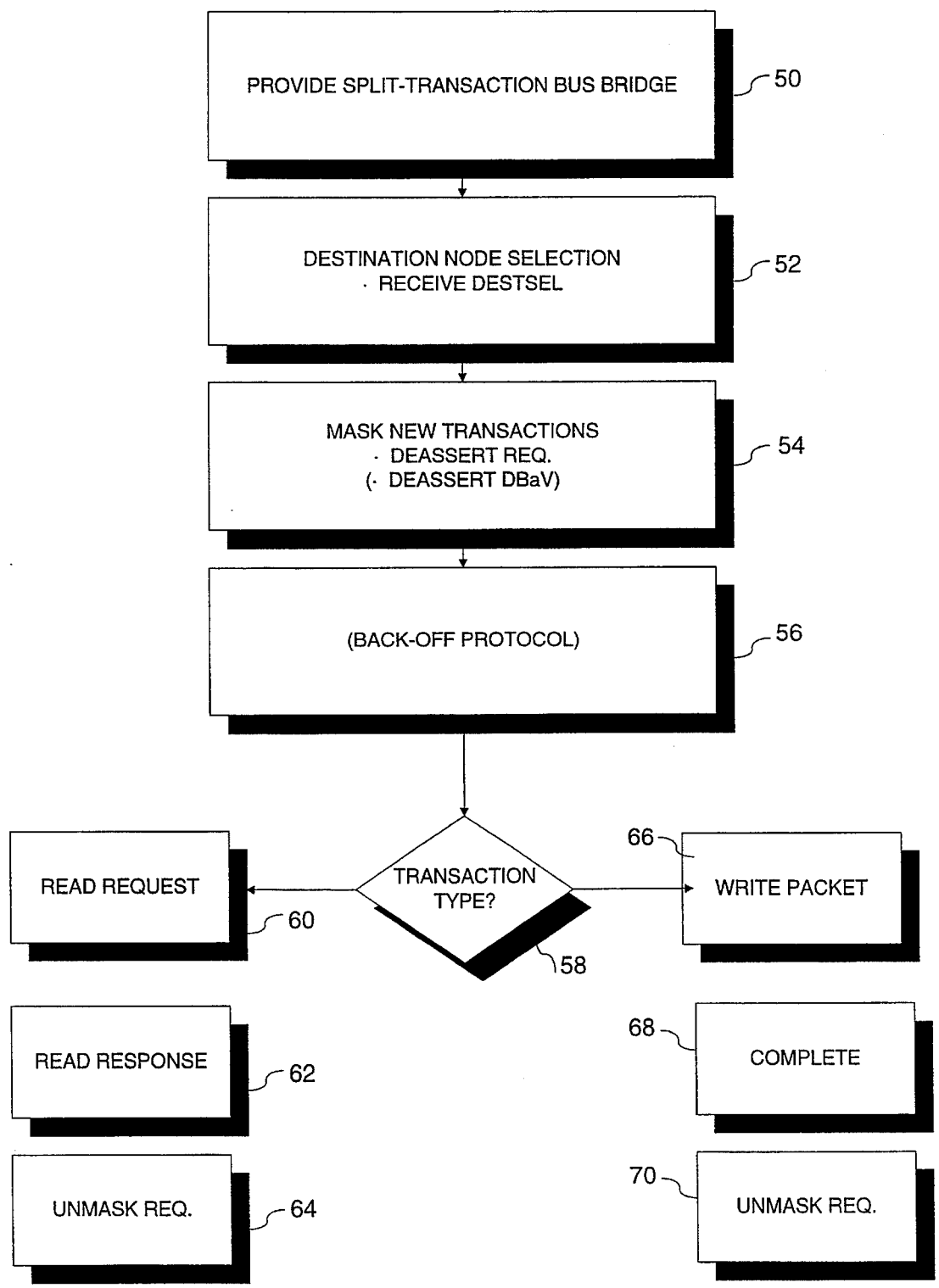
FIG. 3 is a simplified flow chart of an inventive signal communication process from the perspective of a destination node.

FIG. 3 shows a sample process flow for deadlock avoidance wherein simple node 18 serves as destination node. Initially, bus bridge 16 is provided 50 to couple electrically simple node 18 to bus 10 through local bus 20. Bus bridge 16 and simple node 18 then receive 52 DestSel signal (when a bus master receives corresponding Go signal), whereby arbiter 22 indicates that simple node 18 is selected as destination for packet transfer.

Next, Req signal (and optionally DBAv signal as well) is caused to be masked or deasserted by bus bridge 16, so that a new master node cannot source a new transaction on bus 10 in conjunction with simple node 18 through bus bridge 16. Thus, while simple node 18 is servicing the current transaction as destination node, simple node 18 and bus bridge 16 are unhindered and may not entertain new packet transactions.

Additionally, bus bridge may cause a back-off protocol 56 to occur so that packet transfer is delayed further. In particular, such protocol provides that requester node cannot begin packet transfer due to no indication of Done/Valid signals. Also, the protocol may provide that at least two ArbClk cycles occur prior to reassertion of Req or RespReq signal and that Go signal be ignored for specified time.

If data transfer or transaction type is determined 58 by bus bridge 16 or simple node 18 according to packet header information to be data read request 60, then simple node 18 through bus bridge 16 transmits 62 read response packet to source node, according to master read response steps described earlier (i.e., using RespReq signal). Then, Req signal for simple node 18 is unmasked 64 by bus bridge 16 to allow new read or write cycle to begin.

If data transfer or transaction type is determined 58 by bus bridge 16 or simple node 18 according to packet header information to be data write 66, then simple node 18 through bus bridge 16 simply completes data packet burst 68 to its allocated destination node. Then, Req signal for simple node 18 is unmasked 70 by bus bridge 16 to allow new read or write cycle to begin.

We claim:

1. A process for operating a bus signal communication system having a plurality of nodes coupled to a bus for conducting split signal transactions by transferring requested information between a first node and a second node, such that each of the plurality of nodes functions either as a source or a destination node, the process comprising the steps of:

initiating a read-request operation by acquiring ownership of the bus by the first node, the read-request includes a first and a second split signal transactions;

sending a packet header from the first node to the second node during the first split signal transaction;

relinquishing ownership of the bus by the first node;

conducting other split signal transactions on the bus, the other split signal transactions include the first node functioning as a destination node to receive other split signal transactions from one of the plurality of nodes if one of the plurality of nodes is attempting to send a set of information to the first node and the second node functioning as a source node for conducting other split signal transactions to one of the plurality of nodes if the second node is attempting to send a set of information to one of the plurality of nodes;

acquiring ownership of the bus by the second node;

sending the requested information from the second node to the first node during the second split signal transaction; and relinquishing ownership of the bus by the second node.

2. The process of claim 1 wherein the system further includes a simple node which is unconfigured for split signal transactions, the process further comprising the step of:

servicing the split signal transaction.

3. The process of claim 2 wherein the simple node includes a circuit, further comprising the step of:

executing Direct Memory Access (DMA) transfers.

4. The process of claim 2 wherein the simple node is coupled to the bus by a bridge, further comprising the step of:

providing functional capability via the bridge for performing split signal transactions between the simple node and a plurality of nodes coupled to the bus.

5. The process of claim 4 wherein the bridge includes a storage device, further comprising the step of:

indicating availability of the simple node for a split signal transaction.

6. The process of claim 4 wherein the simple nodes serves as a transaction source, further comprising the step of:

initiating the split signal transaction.

7. The process of claim 6 wherein:

the signal transaction is initiated by a bus request signal.

8. The process of claim 6 wherein:

indicating availability of the simple node by a buffer-available signal, such signal indicating availability of a buffer for receiving a signal destined at the transaction source.

9. The process of claim 8 wherein:

the buffer-available signal is deasserted to indicate node unavailability during a split transaction.

10. The process of claim 9 wherein:

the buffer-available signal is asserted to indicate node availability after completion of the signal transaction.

11. The process of claim 4 wherein the simple node serves as a transaction destination, further comprising the step of:

responding to the initiation of the split signal transaction.

12. The process of claim 11 wherein:

the signal transaction is initiated by a signal indicating that the node comprises a signal destination.

13. The process of claim 11 wherein:

node unavailability is indicated by deasserting a bus-ownership request signal, such signal indicating a request for ownership of the bus.

14. The process of claim 10 wherein:

the bus-ownership request signal is deasserted to indicate bus unavailability during the signal transaction.

15. The process of claim 14 wherein:

the bus-ownership request signal is unmasked after completion of the signal transaction.

16. The process of claim 13 wherein:

a back-off protocol is performed after the bus-ownership request signal is deasserted to indicate bus unavailability.

17. The process of claim 16 wherein:

the back-off protocol causes the node to wait for a specified delay and ignore a bus grant signal, such signal indicating a grant of ownership of the bus.

18. The process of claim 1 wherein:

the signal transaction comprises a write operation.

19. The process of claim 1 wherein:

the signal transaction comprises a read operation.

20. The process of claim 2 wherein the plurality of nodes include a mothernode coupled to the bus, further comprising the step of:

performing the split signal transaction between the simple node and the mothernode through the bus.

21. The process of claim 2 wherein the plurality of nodes include a normal node, further comprising the step of:

performing the split signal transaction between the normal node and the simple node.

22. The process of claim 1 further comprising the step of:

providing availability of the destination node to a source node after the signal transaction is completed.

23. A method for transacting signals by transferring information between a first node and a simple node coupled to the bus, the method comprising the steps of:

initiating a read-request operation by acquiring ownership of the bus by the first node, the read-request includes a first and a second split signal transactions;

sending a packet header from the first node to the simple node during the first split signal transaction;

relinquishing ownership of the bus by the first node;

conducting other split signal transactions on the bus, the other split signal transactions include the first node functioning as a destination node to receive other split signal transactions from one of the plurality of nodes if one of the plurality of nodes is attempting to send a set of information to the first node and the simple node functioning as a source node for conducting other split signal transactions to one of the plurality of nodes if the second node is attempting to send a set of information to one of the plurality of nodes;

generating a bus request signal to indicate the simple node is unavailable to serve as a destination node;

acquiring ownership of the bus by the simple node;

sending the requested information from the simple node to the first source node coupled to the bus; and relinquishing ownership of the bus by the simple node.

24. The method of claim 23 wherein one of the node includes a circuit which is unconfigured for split transactions, further comprising the step of:

executing Direct Memory Access (DMA) transfers.

25. The method of claim 23 wherein:

one of the nodes is coupled to the bus by a bridge comprising a storage device for indicating availability of such one node, the first node comprising a transaction source, the signal transaction being initiated by a read request signal, node unavailability being indicated by a buffer-available signal, such buffer-available signal being used for indicating availability of a buffer for receiving a signal destined at the transaction source, the buffer-available signal being deasserted to indicate node unavailability during a split transaction, the buffer-available signal being asserted to indicate node availability after completion of the signal transaction.

26. The method of claim 23 wherein:

one of the nodes is coupled to the bus by a bridge comprising a storage device for indicating availability of such one node, the second node comprising a transaction destination, wherein the second node responds to the initiation of the signal transaction, the signal transaction being initiated by a signal indicating that the second node comprises a signal destination, node unavailability being indicated by a bus-ownership request signal, such bus-ownership request signal being used for indicating a request for ownership of the bus, the bus-ownership request signal being deasserted to indicate node unavailability during the signal transaction, the bus-ownership request signal being unmasked after completion of the signal transaction.

27. The method of claim 26 wherein:

a back-off protocol is performed after the bus-ownership request signal indicates node unavailability, the back-off protocol causing such one node to wait for a specified delay and ignore specified signals.

* * * * *